(12) United States Patent
Geissler et al.

(10) Patent No.: US 7,978,079 B2
(45) Date of Patent: Jul. 12, 2011

(54) ELECTRONIC TAG

(75) Inventors: Randolph K. Geissler, Hudson, WI (US); Steven Lewis, Bloomington, MN (US)

(73) Assignee: Destron Fearing Corporation, South St. Paul, MN (US)

( * ) Notice: Subject to any disclaimer, the term of this patent is extended or adjusted under 35 U.S.C. 154(b) by 792 days.

(21) Appl. No.: 12/044,099

(22) Filed: Mar. 7, 2008

(65) Prior Publication Data

US 2009/0094869 A1    Apr. 16, 2009

Related U.S. Application Data

(60) Provisional application No. 60/979,564, filed on Oct. 12, 2007.

(51) Int. Cl.
  *G08B 13/14*   (2006.01)
  *G08B 23/00*   (2006.01)
(52) U.S. Cl. ............ 340/572.8; 340/572.1; 340/572.9; 340/693.5; 340/693.9
(58) Field of Classification Search .................. None
See application file for complete search history.

(56) References Cited

U.S. PATENT DOCUMENTS

| | | |
|---|---|---|
| 3,934,368 A | 1/1976 | Fearing |
| 3,987,570 A | 10/1976 | McMurray et al. |
| 4,060,921 A | 12/1977 | Robinson |
| RE29,536 E | 2/1978 | Fearing |
| 4,176,482 A | 12/1979 | Steckel |
| 4,209,924 A | 7/1980 | Fearing |
| 4,250,643 A | 2/1981 | Mackenzie |
| 4,425,726 A | 1/1984 | Dvorak |
| RE31,632 E | 7/1984 | Murphy et al. |
| 4,470,212 A | 9/1984 | Stafford et al. |
| 4,581,834 A | 4/1986 | Zatkos et al. |
| 4,612,877 A | 9/1986 | Hayes et al. |
| 4,635,389 A | 1/1987 | Oudelette |
| 4,653,208 A | 3/1987 | Wassilieff |
| 4,691,458 A | 9/1987 | Scott |
| 4,741,117 A | 5/1988 | Fearing |
| 4,953,313 A | 9/1990 | Scott |
| 4,958,452 A * | 9/1990 | Tate .............................. 40/301 |
| 5,051,741 A | 9/1991 | Wesby |
| 5,228,224 A | 7/1993 | Gardner |
| 5,302,954 A | 4/1994 | Brooks et al. |
| 5,308,351 A | 5/1994 | Nehls |
| 5,446,447 A | 8/1995 | Carney et al. |
| 5,450,492 A | 9/1995 | Hook et al. |
| 5,461,806 A | 10/1995 | Bristow, Jr. |

(Continued)

FOREIGN PATENT DOCUMENTS

EP    0 670 562 A1    9/1995

(Continued)

OTHER PUBLICATIONS

"FDX Lightweight Ultra Bovine EID Tag ISO Compliant," Allflex USA, Inc., www.allfexusa.com, 10 pages (2004).

(Continued)

*Primary Examiner* — Julie Lieu
(74) *Attorney, Agent, or Firm* — Merchant & Gould P.C.

(57) ABSTRACT

The present disclosure relates to an electronic tag, and more particularly to an electronic tag including an insulating cap. When the electronic tag is being made, the insulating cap is arranged adjacent to heat-sensitive electronic components. The insulating cap protects the electronics from the heat generated when injection molding with hot plastic.

39 Claims, 7 Drawing Sheets

U.S. PATENT DOCUMENTS

| | | | |
|---|---|---|---|
| 5,473,830 A | 12/1995 | Doble | |
| 5,477,215 A | 12/1995 | Mandelbaum | |
| 5,510,769 A | 4/1996 | Kajfez et al. | |
| 5,520,417 A | 5/1996 | Kennemer | |
| 5,675,920 A | 10/1997 | Long | |
| 5,680,106 A | 10/1997 | Schrott et al. | |
| 5,725,261 A | 3/1998 | Rahn | |
| 5,812,065 A | 9/1998 | Schrott et al. | |
| 5,936,527 A | 8/1999 | Isaacman et al. | |
| 5,964,656 A | 10/1999 | Lawler, Jr. et al. | |
| 6,021,592 A | 2/2000 | Caisley | |
| 6,055,752 A | 5/2000 | Ritchey | |
| 6,107,910 A | 8/2000 | Nysen | |
| 6,127,928 A | 10/2000 | Issacman et al. | |
| 6,145,225 A | 11/2000 | Ritchey | |
| 6,145,226 A | 11/2000 | Finlayson | |
| 6,154,139 A | 11/2000 | Heller | |
| 6,163,259 A | 12/2000 | Barsumian et al. | |
| 6,196,912 B1 | 3/2001 | Lawler, Jr. et al. | |
| 6,211,789 B1 | 4/2001 | Oldham et al. | |
| 6,231,435 B1 | 5/2001 | Pilger | |
| 6,329,920 B1 | 12/2001 | Morrison et al. | |
| 6,342,839 B1 | 1/2002 | Curkendall et al. | |
| 6,346,884 B1 | 2/2002 | Uozumi et al. | |
| 6,346,885 B1 | 2/2002 | Curkendall | |
| 6,362,737 B1 | 3/2002 | Rodgers et al. | |
| 6,366,206 B1 | 4/2002 | Ishikawa et al. | |
| 6,375,612 B1 | 4/2002 | Guichon et al. | |
| 6,405,462 B1 | 6/2002 | Gardner et al. | |
| 6,439,169 B1 | 8/2002 | Miyawaki | |
| 6,480,100 B1 | 11/2002 | Frieden et al. | |
| 6,480,699 B1 | 11/2002 | Lovoi | |
| 6,509,828 B2 | 1/2003 | Bolavage et al. | |
| 6,510,630 B1 | 1/2003 | Gardner | |
| 6,531,957 B1 | 3/2003 | Nysen | |
| 6,545,604 B1 | 4/2003 | Dando et al. | |
| 6,554,188 B1 | 4/2003 | Johnson et al. | |
| 6,569,092 B1 | 5/2003 | Guichon et al. | |
| 6,598,800 B1 | 7/2003 | Schmit et al. | |
| 6,608,561 B2 | 8/2003 | Lawler, Jr. et al. | |
| 6,613,179 B1 | 9/2003 | McCoy et al. | |
| 6,649,403 B1 | 11/2003 | McDevitt et al. | |
| 6,664,897 B2 | 12/2003 | Pape et al. | |
| 6,666,170 B1 | 12/2003 | Hilpert | |
| 6,698,119 B2 | 3/2004 | Jacob et al. | |
| 6,700,547 B2 | 3/2004 | Mejia et al. | |
| 6,708,881 B2 | 3/2004 | Hartmann | |
| 6,713,298 B2 | 3/2004 | McDevitt et al. | |
| 6,720,930 B2 | 4/2004 | Johnson et al. | |
| 6,724,309 B2 | 4/2004 | Grose et al. | |
| 6,745,008 B1 | 6/2004 | Carrender et al. | |
| 6,825,763 B2 | 11/2004 | Ulrich et al. | |
| 6,831,562 B2 | 12/2004 | Rodgers et al. | |
| 6,840,440 B2 | 1/2005 | Uozumi et al. | |
| 6,847,892 B2 | 1/2005 | Zhou et al. | |
| 6,859,672 B2 | 2/2005 | Roberts et al. | |
| 6,878,052 B2 | 4/2005 | Andersson | |
| 6,916,295 B2 | 7/2005 | Tasch et al. | |
| 6,982,646 B2 | 1/2006 | Rodgers et al. | |
| 6,983,687 B2 | 1/2006 | McCoy | |
| 6,988,080 B2 | 1/2006 | Zack et al. | |
| 7,009,515 B2 | 3/2006 | Carrender | |
| 7,019,639 B2 | 3/2006 | Stilp | |
| 7,023,341 B2 | 4/2006 | Stilp | |
| 7,049,942 B2 | 5/2006 | Gallovich | |
| 7,079,020 B2 | 7/2006 | Stilp | |
| 7,082,344 B2 | 7/2006 | Ghaffari | |
| 7,084,756 B2 | 8/2006 | Stilp | |
| 7,091,860 B2 | 8/2006 | Cortina et al. | |
| 7,098,793 B2 | 8/2006 | Chung | |
| 7,106,189 B2 | 9/2006 | Burneske et al. | |
| 7,116,212 B2 | 10/2006 | Horwitz et al. | |
| 7,116,230 B2 | 10/2006 | Klowak | |
| 7,142,118 B2 | 11/2006 | Hamilton et al. | |
| 7,158,030 B2 | 1/2007 | Chung | |
| 7,167,095 B2 | 1/2007 | Carrender | |
| 7,242,306 B2 | 7/2007 | Wildman et al. | |
| 7,248,933 B2 | 7/2007 | Wildman | |
| 7,250,917 B1 | 7/2007 | Thompson et al. | |
| 7,252,230 B1 | 8/2007 | Sheikh et al. | |
| 7,256,696 B2 | 8/2007 | Levin | |
| 7,463,156 B2 * | 12/2008 | Baba et al. | 340/572.8 |
| 2002/0010390 A1 | 1/2002 | Guice et al. | |
| 2002/0148146 A1 | 10/2002 | Hogan | |
| 2002/0188470 A1 | 12/2002 | Hogan | |
| 2003/0038721 A1 | 2/2003 | Hogan | |
| 2003/0121188 A1 | 7/2003 | Haar et al. | |
| 2004/0021313 A1 | 2/2004 | Gardner et al. | |
| 2004/0027251 A1 | 2/2004 | Sharony | |
| 2004/0144004 A1 | 7/2004 | Constatini | |
| 2004/0150528 A1 | 8/2004 | Natividade et al. | |
| 2004/0211332 A9 | 10/2004 | Apana et al. | |
| 2005/0024183 A1 | 2/2005 | Carter et al. | |
| 2005/0052283 A1 | 3/2005 | Collins et al. | |
| 2005/0075900 A1 | 4/2005 | Arguimbau, III | |
| 2005/0115507 A1 | 6/2005 | Halachmi et al. | |
| 2005/0144992 A1 * | 7/2005 | Belden | 70/57.1 |
| 2005/0145187 A1 * | 7/2005 | Gray | 119/174 |
| 2005/0161007 A1 | 7/2005 | Huisma et al. | |
| 2006/0038658 A1 | 2/2006 | Jarvis et al. | |
| 2006/0114109 A1 | 6/2006 | Geissler | |
| 2007/0103315 A1 | 5/2007 | Geissler | |
| 2007/0229266 A1 * | 10/2007 | Gibson | 340/572.1 |
| 2008/0100423 A1 | 5/2008 | Geissler et al. | |
| 2008/0122302 A1 * | 5/2008 | Leininger | 310/50 |

FOREIGN PATENT DOCUMENTS

| | | |
|---|---|---|
| EP | 1438607 | 7/2004 |
| WO | WO 99/27777 | 6/1999 |
| WO | WO 02/060244 A1 | 8/2002 |
| WO | WO 03/051108 A2 | 6/2003 |
| WO | WO 03/079773 A1 | 10/2003 |
| WO | WO 2005/034617 A1 | 4/2005 |

OTHER PUBLICATIONS

"RFID The Next Generation in AIDC," www.satoworldwide.com, pp. 1-54 (Oct. 29, 2004).

U.S. Appl. No. 12/017,330 titled "Animal Management System Including Radio Animal Tag and Additional Tranceiver(s)," filed Jan. 21, 2008, 91 pages.

International Search Report and Written Opinion of International Application No. PCT/US2007/083184, mailed Jun. 6, 2008.

International Search Report and Written Opinion of International Application No. PCT/US2008/051586, mailed Jun. 16, 2008.

* cited by examiner

ELECTRONIC TAG

CROSS-REFERENCE TO RELATED APPLICATION

This Application claims priority to U.S. Provisional Patent Application No. 60/979,564, titled "ELECTRONIC TAG," filed on Oct. 12, 2007, which is hereby incorporated by reference in its entirety.

TECHNICAL FIELD

The present disclosure relates to an electronic tag, and more particularly to an electronic tag including an insulating cap. When the electronic tag is being made, the insulating cap is arranged adjacent to heat-sensitive electronic components. The insulating cap protects the electronics from the heat generated when injection molding with hot plastic.

BACKGROUND

Electronic tags are useful for in a variety of applications. Some electronic tags are connected to animals, such as livestock. These electronic tags are useful for a variety of reasons, including locating animals, monitoring animal activity, and detecting symptoms of an illness or disease (such as a lack of activity or appetite). Other electronic tags are connected or associated with various types of objects. For example, some electronic tags are used as part of a theft deterrence system (to deter a person from stealing equipment or merchandise), for locating misplaced devices (such as medical equipment in a health care facility), and for the tracking of lost or stolen items.

Electronic tags are sometimes used in harsh environments. For example, electronic tags attached to livestock are not only exposed to occasional scraping and bumping, such as against a wall, post, or other animal, but are also exposed to ultraviolet radiation, temperature variations, and moisture. As a result, electronic tags sometimes include a housing that provides protection to sensitive electronics.

SUMMARY

The present disclosure relates to an electronic tag, and more particularly to an electronic tag including an insulating cap. When the electronic tag is being made, the insulating cap is arranged adjacent to heat-sensitive electronic components. The insulating cap protects the electronics from the heat generated when injection molding with hot plastic.

In one exemplary configuration an electronic device is enclosed within a housing that protects the electronic device. The housing includes a body, an insulating cap, and a cover. The electronic device is enclosed between the body and the insulating cap. A cover is formed on the insulating cap.

Another aspect is an electronic tag for an animal including an electronic device, a housing, and a fastener. The housing includes a body, and insulating cap, and a cover. The electronic device is enclosed between the body and the insulating cap. The cover is on the insulating cap and connected to the body. The fastener is arranged for engagement with the housing to attach the housing to the animal.

Another aspect is an electronic tag including an electronic device, a body, a thermally insulating cap, and a cover. The body is adjacent the electronic device. The thermally insulating cap is arranged to enclose the electronic device between the insulating cap and the body. The cover is on the insulating cap and enclosing the insulating cap and the electronic device between the cover and the body. The cover includes injection molded plastic.

Yet another aspect is a method of making an electronic tag. The method includes enclosing an electronic device between the body and an insulating cap; and injection molding a cover to enclose the electronic device and the insulating cap between the cover and the body portion, wherein the insulating cap insulates the electronic device from heat generated during injection molding.

Another aspect is a method of making an electronic tag. The method includes enclosing an electronic device between the body and a cap; and injection molding a cover to enclose the electronic device and cap between the cover and the body portion, wherein the cap protects the electronic device from heat generated during injection molding.

DETAILED DESCRIPTION

Figure 1:
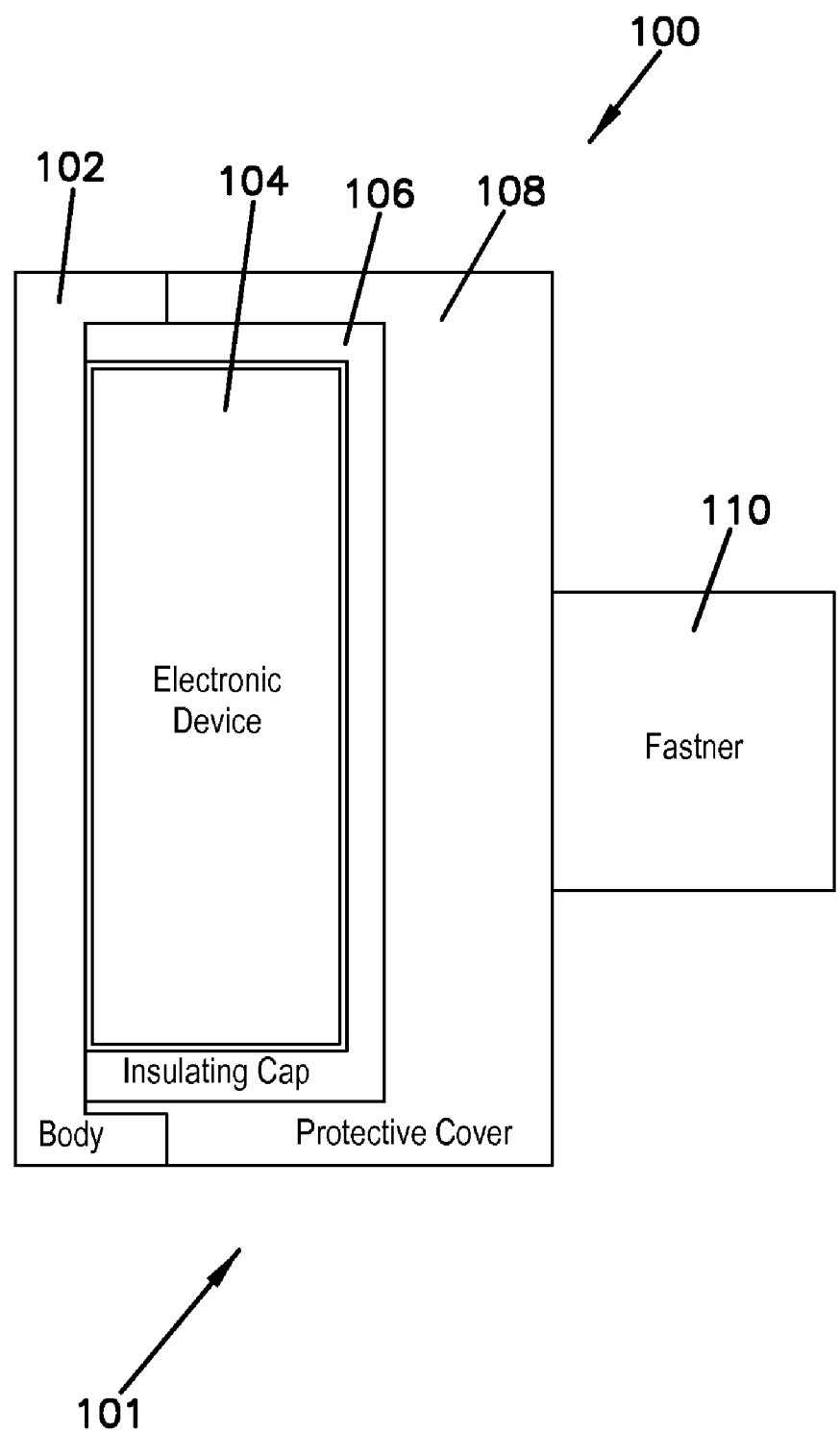
FIG. 1 is a cross-sectional block diagram of an exemplary electronic tag.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to protection of electronic devices. In one possible configuration and by non-limiting example, an electronic device is enclosed within a housing that protects the electronic device. In one embodiment, a portion of the housing is formed by a process that could damage the electronic device. For example, an injection molding process is used to form a cover of the housing. Heat from the injection molding process, if applied directly to the electronic device could cause damage to the electronic device. As a result, the housing includes an insulating cap that protects the electronic device from damage during the formation of the cover. In addition, some electronic devices can be damaged from pressure generated during injection molding. In some embodiments, the insulating cap protects the electronic device from the pressure.

FIG. 1 is a cross-sectional block diagram of exemplary electronic tag 100. Electronic tag 100 includes a housing 101, and electronic device 104, and an optional fastener 110. The fastener 110 can be attached to housing 101, such as to connect electronic tag 100 to another object. Housing 101 includes body 102, insulating cap 106, and cover 108. Electronic device 104 is enclosed between body 102 and insulating cap 106. Electronic device 104 is any device that uses electricity. Some examples of electronic device 104 include a radio frequency (RF) transmitter receiver, or transceiver; an antenna; a microprocessor; analog or digital electronics; a battery; or other electronic devices.

Body 102 supports electronic device 104. In some embodiments, electronic device 104 is mounted to body 102 with a fastener such as a screw, adhesive, or other known fasteners. In other embodiments, electronic device 104 is not rigidly connected to body 102, but is placed adjacent to body 102.

Many electronic devices are heat-sensitive, and the maximum temperature that any particular electronic device can withstand varies. In some embodiments, the electronic device 104 is able to withstand temperatures up to about 50° C. In another embodiment, the electronic device 104 is able to withstand temperatures up to about 90° C. For example, some batteries include a seal around the battery housing that can be damaged if the temperature exceeds about 90° C. In another embodiment, the electronic device 104 is able to withstand temperatures up to about 150° C. In another embodiment, the electronic device 104 is able to withstand temperatures up to about 200° C. For example, solder often has a melting point in a range from about 200 to about 215° C. If the temperature exceeds this range, the solder will begin to melt, potentially resulting in damage to the electronic device. Other embodiments include other temperature thresholds.

Insulating cap 106 is arranged to enclose electronic device 104 between insulating cap 106 and body 102. In some embodiments, insulating cap 106 is formed of a thermally insulating material, such that heat produced during the formation of cover 108 does not damage electronic device 104. In some embodiments, cap 106 forms a pressure barrier, to protect electronic device 104 from pressure generated during manufacturing processes, such as an injection molding process.

Insulating cap 106 insulates the electronic device 104 from heat generated by hot plastic. Various modifications can be made to adjust the maximum temperature that the electronics will be exposed to. One example is that the thickness of insulating cap 106 can be changed depending on the maximum temperature that electronic device 104 can withstand. By increasing the thickness of insulating cap 106, the maximum temperature experienced by electronic device 104 is reduced. In some embodiments the thickness of insulating cap 106 is in a range from about 0.001 inches to about 0.2 inches, and preferably from about 0.01 inches to about 0.04 inches.

In addition, the height of insulating cap 106 can be increased to increase the amount of air enclosed by the insulating cap around the electronics. The increased air present reduces the maximum temperature experienced by the electronic device 104. Another advantage of some embodiments is reduced weight because the insulating cap traps air within the electronic tag 100 that would otherwise be filled with the material of cover 108. In some embodiments, the air trapped within electronic tag 100 by insulating cap 106 provides an additional advantage in that the tag 100 has a reduced weight. If the insulating cap 106 was not present, additional plastic would be needed to fill in the space occupied by the air.

Another advantage of some embodiments is that insulating cap 106 improves antenna performance. If plastic is formed in close proximity to an antenna, the performance of the antenna can change or degrade. Insulating cap 106 can be used to provide a space, even if only a small space, between the insulating cap 106 (and cover 108) and the antenna to result in improved antenna performance as compared with the performance if plastic were directly molded to the antenna.

In some embodiments, insulating cap 106 protects electronic device 104 from exceeding a predetermined maximum temperature. In one embodiment, insulating cap 106 maintains the temperature of electronic device 104 below about 50° C. In another embodiment, insulating cap 106 maintains the temperature of electronic device 104 below about 90° C. In a further embodiment, insulating cap 106 maintains the temperature of electronic device 104 below about 150° C. In yet another embodiment, insulating cap 106 maintains the temperature of electronic device 104 below about 200° C. In a further embodiment, insulating cap 106 maintains the temperature of electronic device 104 below the temperature of the material of cover 108 when cover 108 is being formed over the insulating cap. Other embodiments of insulating cap 106 are designed to maintain the temperature of the electronic device 104 below other temperature thresholds.

Insulating cap 106 can be formed of various materials, such as a polymer or other suitable materials. In one embodiment, insulating cap 106 is made of nylon. In some embodiments, the material of insulating cap 106 has a higher melting temperature than the material used to form cover 108, such that when cover 108 is formed over insulating cap 106, the material of cover 108 does not melt the insulating cap.

Cover 108 is adjacent insulating cap 106 and opposite electronic device 104. In some embodiments, cover 108 is formed by injection molding of plastic. Injection molding typically requires heating of a material, such as plastic, to a temperature sufficient to cause the material to flow. The material is introduced into a mold to fill empty space within the mold. The material is then allowed to cool, which causes the material to harden and adhere to contacted surfaces. One of the benefits of injection molding is that it is less expensive than other manufacturing techniques, such as those involving epoxy.

Fastener 110 is connectable to housing 101 to attach housing 101 to another object. Although fastener 110 is shown as being connected to cover 108, fastener 110 can be connected to any location of housing 101. One example of a fastener is a pin, such as the type that can be inserted through the ear of an animal for livestock identification. In some embodiments, fastener 110 also includes a grommet or other device for engagement with the pin. Other types of fasteners can also be used, such as a screw, nut and bolt, nail, staple, rivet, adhesive, tape, rope, thread, clip, clamp, or other known fasteners. Some embodiments do not include fastener 110.

Figure 2:
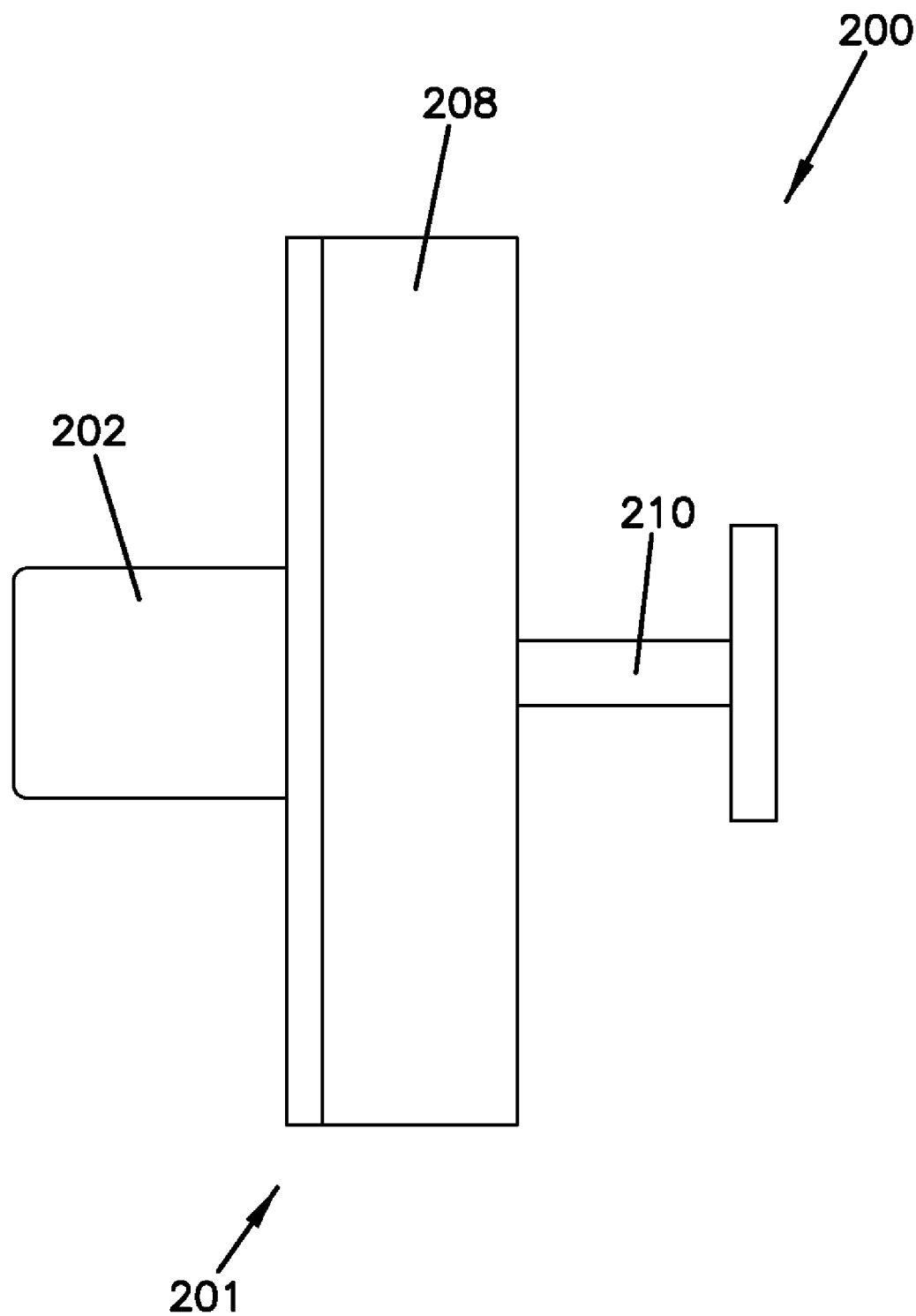
FIG. 2 is a schematic side view of another exemplary electronic tag in a fully assembled state.

FIG. 2 is a schematic side view of an exemplary embodiment of electronic tag 200 in a fully assembled state. Electronic tag 200 includes housing 201 and fastener 210. Housing 201 includes body 202, insulating cap 206 (shown in FIG. 3) and cover 208. Electronic tag 200 also includes electronic device 204 (shown in FIG. 3). The insulating cap and electronic device are located between cover 208 and body 202.

In one embodiment, electronic tag 200 is used for animal identification or tracking. The term "animal" refers to macroscopic animals including vertebrates. Animals include domesticated animals, such as livestock and companion animals, and wild animals, such as game animals or fish. Livestock include animals such as a swine (e.g., pig and piglet), sheep, lamb, goat, bovine (e.g., cow), fish (e.g., salmon), and birds (e.g., chickens, ducks, and geese).

Body 202 is a side of electronic tag 200, and adjacent to an electronic device not shown in FIG. 2. In one embodiment, body 202 is formed of a plastic. Other materials are used in other embodiments, including metal or metal-alloy, wood, rubber, composites, or other materials. In some embodiments, body 202 is formed of an impact resistant material, such that it resists cracking or breaking when impacted with another object, such as a wall or post. In other embodiments, body 202 is formed of a weather-resistant material, such that it is not easily damaged by ultra-violet rays, water, temperature variations, and the like.

Cover 208 is, for example, made from a plastic material, such as through injection molding to body 202 and other components of electronic tag 200. Other embodiments include other materials and methods of manufacture. Cover connected to portions of body 202 to form a seal between the cover 208 and the portions of body 202. In some embodiments, cover 208 provides a water-tight seal against fluid intrusion between body 202 and cover 208.

Fastener 210 is a pin for insertion through the ear of an animal to connect electronic tag 200 in place on the ear. Fastener 210 includes a head that prevents fastener 210 from extending entirely through the ear. In other embodiments, fastener 210 is used to connect electronic tag 200 to other parts of an animal, or to an object other than an animal, such as a machine, book, product, or other object.

Figure 3:
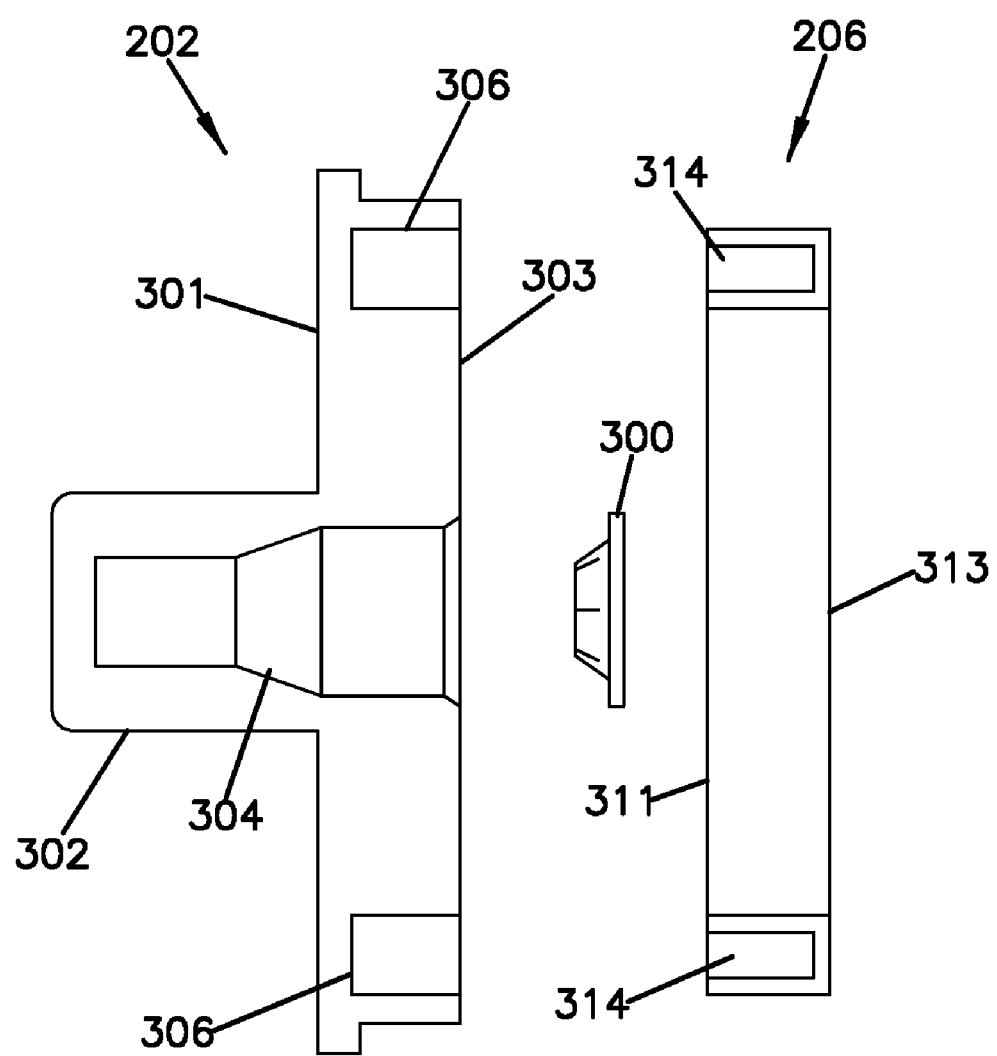
FIG. 3 is a side cross-sectional and exploded view of portions of the example electronic tag shown in FIG. 2.

FIG. 3 is a side cross-sectional and exploded view of portions of the example electronic tag 200 shown in FIG. 2. The portions shown include body 202, insulating cap 206, and grommet 300. (Fastener 210 and cover 208 are not shown in FIG. 3). Body 202 includes a first side 301 and a second side 303, the second side 303 being opposite the first side 301. Body 202 also includes knob 302, fastener receptacle 304, and channel 306. In the exemplary embodiment, body 202 has a circular profile when viewed from first side 301 or second side 303, and all features (including knob 302, fastener receptacle 304, and channel 306) similarly have a circular profile when viewed from first side 301 or second side 303. There is no requirement that body 202 or the associated features have a circular profile.

Knob 302 projects out from first side 301 of body 202, and in this example has a generally cylindrical outer shape. Other embodiments include other possible shapes. In yet other embodiments, knob 302 is not included. Knob 302 can be grasped during installation of the electronic tag (e.g., 200 shown in FIG. 2) to an object, to aid in connecting the housing (e.g., 201 shown in FIG. 2) to the fastener (e.g., 210, shown in FIG. 2). In other embodiments, knob 302 provides an enlarged area for fastener receptacle 304.

Body 202 also includes fastener receptacle 304 that extends into body 202 from side 303, and partially into knob 302. Fastener receptacle 304 is sized and shaped to receive a portion of a fastener, such as the tip of a pin.

Channel 306 extends into body 202 from side 303, and forms a chamber for receiving one or more electronic devices. In this example, channel 306 has a ring-shape, although various shapes can be used in other embodiments. In addition, some embodiments do not include channel 306, but rather include a flat side 303 without channel 306. Channel 306 is sized and shaped to receive the one or more electronic devices, such as electronic device 204, shown in FIG. 4.

Body 202 is preferably made of a non-conductive material, such that electricity will not be conducted through body 202 to or from an electronic device within the electronic tag. For example, body 202 is made of molded plastic. Other embodiments of body 202 are made from other materials such as rubber, wood, metal or metal alloy, composites, and the like. Features of body 202 can be formed by known processing methods, such as molding, cutting, sawing, drilling, grinding, routing, and the like.

Grommet 300 is an optional part of fastener 210 (shown in FIG. 2) for use in conjunction with a pin having a retention shoulder. Grommet 300 includes a ring-shaped member having a convex inner portion that extends to a central orifice. The convex inner portion includes slits. A pin can be inserted into the central orifice of grommet 300, causing the convex inner portion to bend and expand at the slits. The pin is inserted until the retention shoulder has passed through grommet 300 and into fastener receptacle 304, at which time the grommet returns to its original state. Once the pin has been inserted, the convex inner portion resists removal of the pin from the fastener receptacle by contacting the retention shoulder. Other known fasteners can be used in other embodiments.

Insulating cap 206 can provide thermal insulation to an electronic device. In this example, insulating cap 206 is sized to fit at least partially into channel 306 and over an electronic device to enclose the electronic device between body 202 and the insulating cap 206. In this embodiment, insulating cap 206 is ring-shaped and includes side 311, side 313, and channel 314. Side 311 is opposite side 313. Channel 314 extends into insulating cap 206 from side 311 and is sized to receive at least a portion of an electronic device. In some embodiments, channel 314 is sized to be larger than the electronic device, so as to trap air within channel 314. In another embodiment, insulating cap 206 is a flat ring that fits across channel 306.

Insulating cap 206 is distinct from body 202 and electronic device, and is preferably made separate from body 202 and the electronic device. Insulating cap 206 is made from a thermally insulating material, such as a high temperature resistant polymer. One example of a high temperature resistant polymer is acetal. The insulating cap insulates a temperature sensitive electronic device from heat generated by a potentially damaging process, such as injection molding of cover 208 (shown in FIG. 2). The insulating properties of insulating cap 206 can be further improved by sizing channel 314 such that air is trapped within channel 314.

Figure 4:
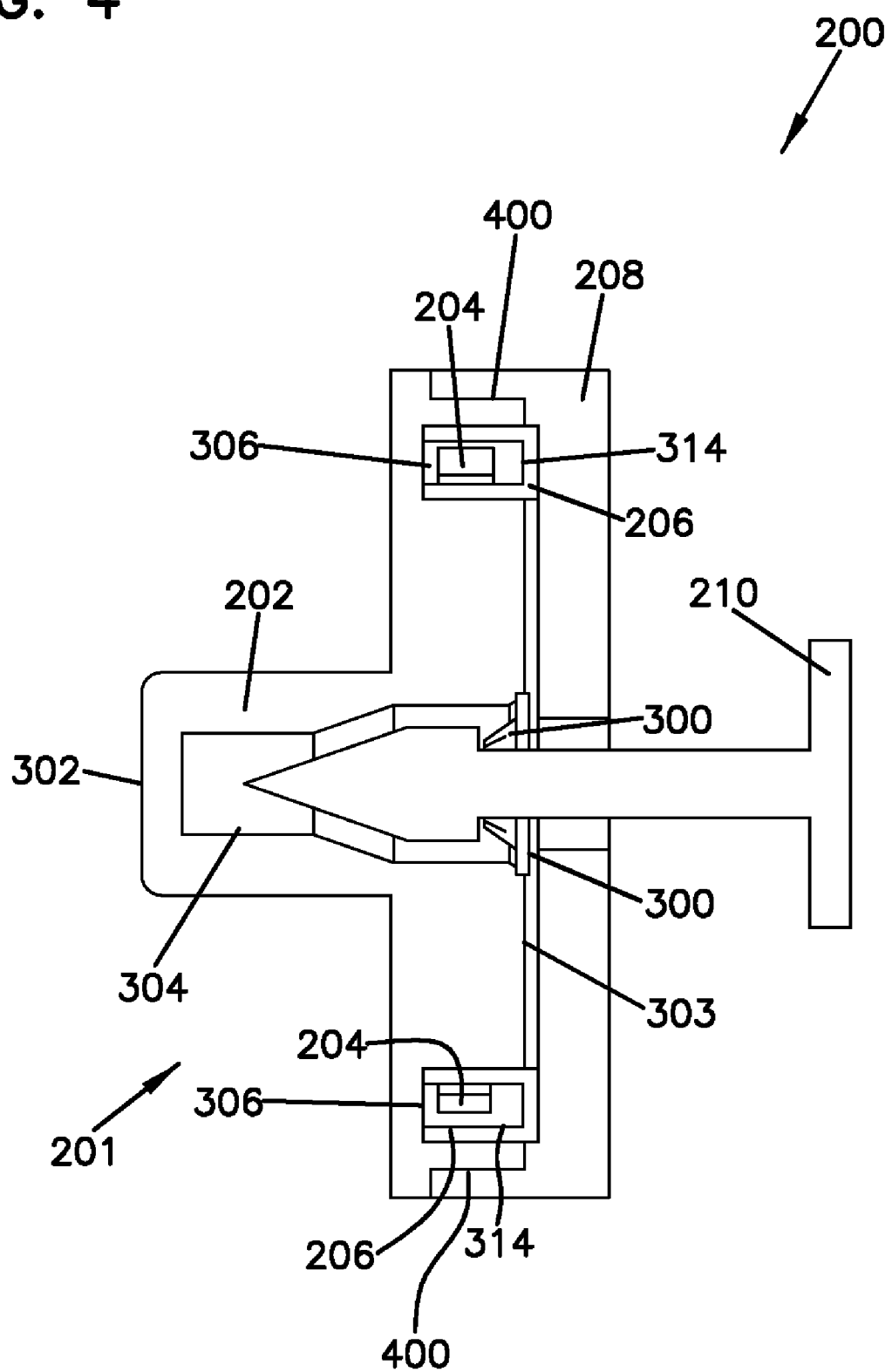
FIG. 4 is a side cross-sectional view of the electronic tag shown in FIG. 2 in a fully assembled state.

FIG. 4 is a side cross-sectional view of the electronic tag 200 in a fully assembled state. Electronic tag 200 includes body 202, electronic device 204, insulating cap 206, cover 208, and fastener 210. Once body 202, electronic device 204, insulating cap 206, and fastener 210 are formed, electronic tag 200 is ready for assembly. One exemplary process for assembling electronic tag 200 will now be described, although other processes can also be used.

Electronic device 204 is arranged adjacent to body 202, such by inserting electronic device 204 into channel 306. An example of electronic device 204 is an antenna and a radio frequency identification tag. If desired, electronic device 204 can be fastened to body 202 with a fastener such as an adhesive, but fastening is not required in all embodiments. Electronic device 204 could potentially be damaged by heat generated in subsequent processing steps. For example, heat applied to an antenna of electronic device 204 could cause the antenna to expand and damage the ability of the antenna to transmit or receive on a desired radio frequency or band of radio frequencies.

As a result, electronic device 204 is next enclosed between body 202 and insulating cap 206 to protect the electronic device 204 from heat or pressure. To do so, insulating cap 206 is inserted at least partially into channel 306 and forms a pressure seal with channel 306 to enclose electronic device 204. Grommet 300 is then placed onto fastener receptacle 304 at side 303 of body 202.

Cover 208 is then formed over insulating cap 206 and portions of body 202, such as by injection molding plastic. The injection molded plastic is hot. Insulating cap 206 and body 202 insulate electronic device 204 from the heat from the injection molded plastic. Cover 208 is hardens as it cools and forms a seal with body 202 at joint 400. The seal at joint 400 resists disengagement of cover 208 from body 202. In addition, the seal at joint 400 also resists fluid intrusion, such as to protect electronic device 204 from conductive fluids and corrosion.

Fastener 210, shown as a pin in FIG. 4, is then partially inserted into fastener receptacle 304 of body 202, and is engaged by grommet 300 to resist disengagement of the fastener from housing 201. In addition, fastener 210 is preferably inserted first through another object, such as an ear of an animal to fasten the electronic tag to the object.

Figure 5:
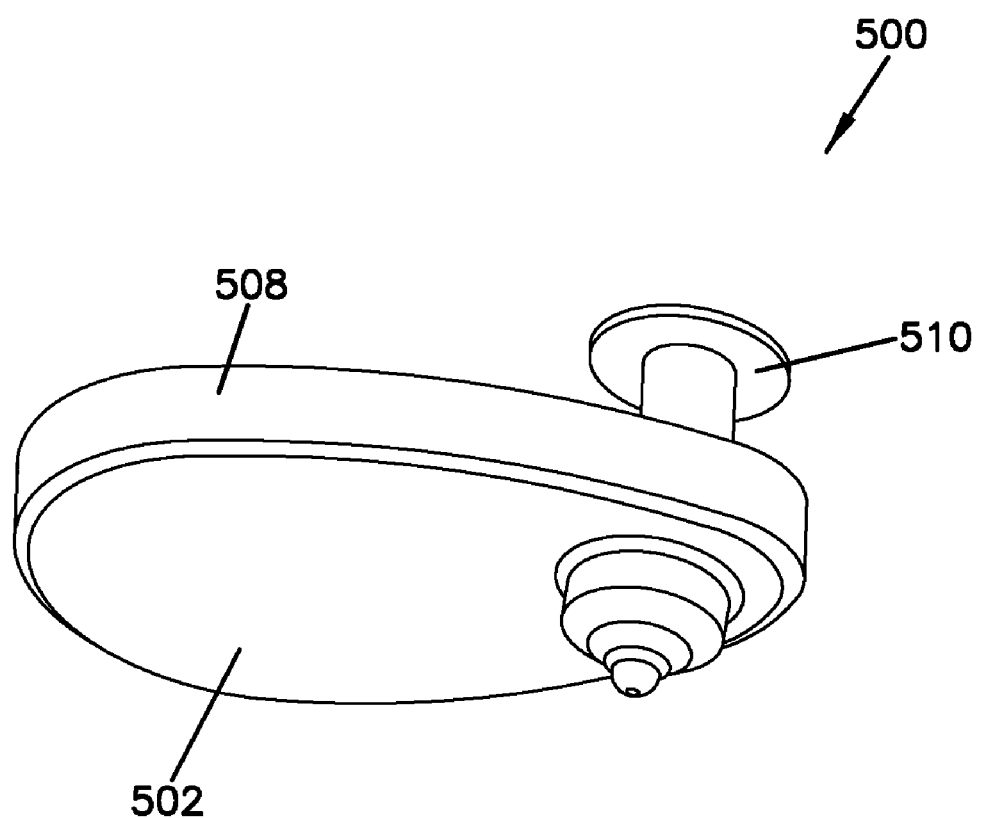
FIG. 5 is a perspective view of another exemplary embodiment of an electronic tag.
Figure 6:
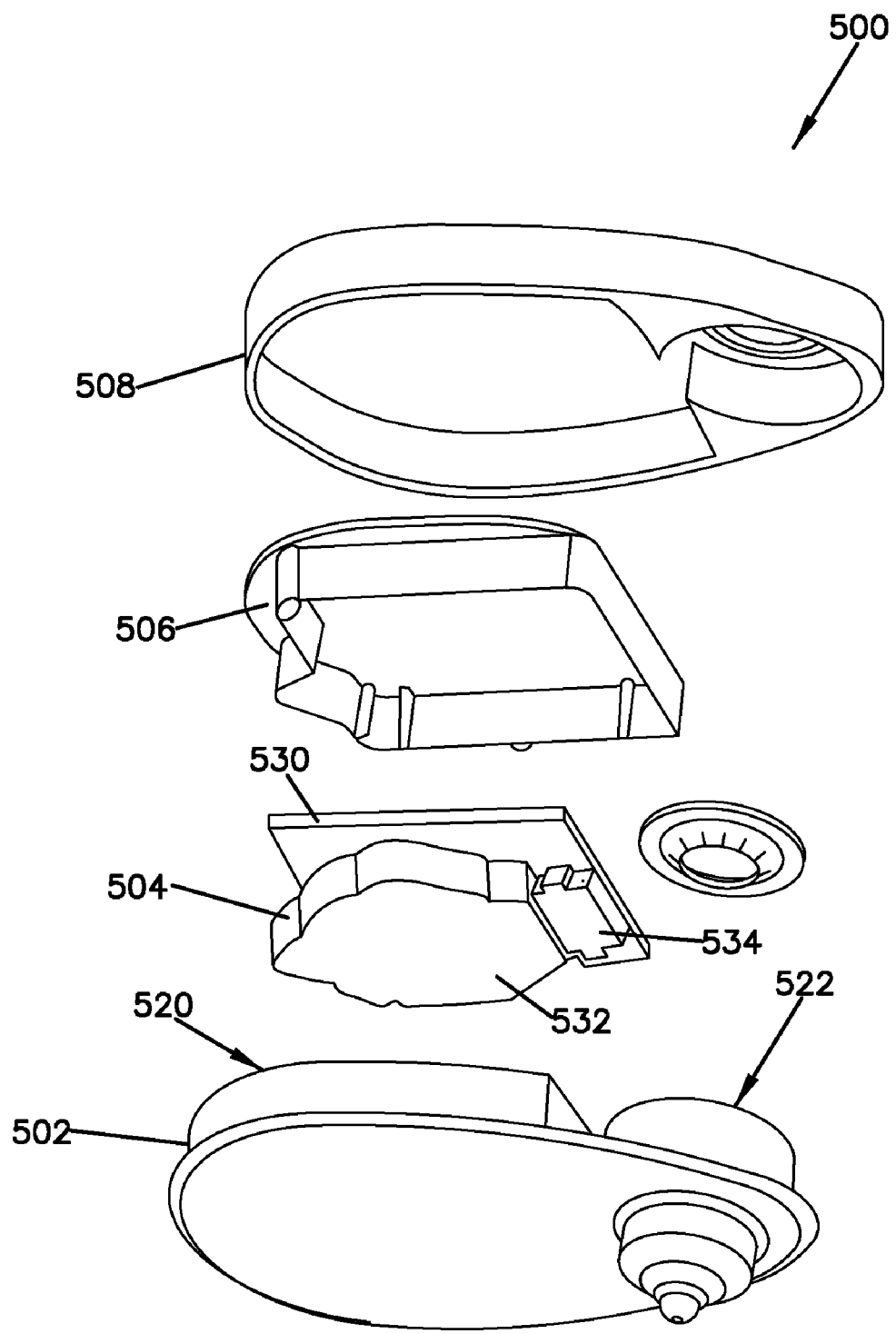
FIG. 6 is an exploded perspective view of the electronic tag shown in FIG. 5.

FIG. 5-6 illustrate another exemplary embodiment of an electronic tag 500. FIG. 5 is a perspective view of electronic tag 500 in a fully assembled state. FIG. 6 is an exploded perspective view of electronic tag 500. Electronic tag 500 includes body 502, electronic device 504, insulating cap 506, and cover 508.

Electronic device 504 is arranged adjacent to body 502, and can be fastened to body 502 if desired. Body 502 includes electronics receptacle 520 and fastener receptacle 522. In one embodiment, electronics receptacle 520 includes a recessed region and sidewalls. The electronics receptacle 520 is sized to receive at least a portion of electronic device 504. Fastener receptacle 522 is arranged to receive at least a portion of fastener 510.

Electronic device 504 includes circuit board 530, battery 532, and radio frequency identification circuitry 534. Battery 532 and radio frequency identification circuitry 534 are electrically connected to circuit board 530.

Insulating cap 506 is arranged to enclose electronic device 504 between body 502 and insulating cap 506, and more specifically between electronics receptacle 520 and insulating cap 506. In addition, air is trapped between insulating cap 506 and body 502. Insulating cap 506 works in conjunction with body 502 to insulate electronic device 504 from potentially damaging heat, such as from an injection molding process. In some embodiments, insulating cap 506 protects electronic device 504 from pressure generating during a manufacturing process, such as during injection molding.

After insulating cap 506 has been arranged to enclose electronic device 504 between insulating cap 506 and body 502, cover 508 is formed, such as with an injection molding process. Cover 508 provides a protective outer surface to electronic tag 500 and also seals the electronic tag 500, such as to prevent fluid intrusion into electronic tag 500. Fastener 510 can then be connected to attach electronic tag 500 to an object, such as by inserting the fastener into fastener receptacle 522.

In some embodiments, electronic tag 500 is sterilized after formation of cover 508. Protective cover 508 seals the electronic tag 500 to prevent moisture from intruding into the electronic tag 500 during the sterilization process. In addition, electronic device 204 is insulated from heat generated during the sterilization process by body 502, insulating cap 506, cover 508, and by air trapped within electronic tag 500.

Other embodiments include other structures and methods. Examples are described in related co-pending patent applications including U.S. patent application Ser. No. 12/017,330 titled "ANIMAL MANAGEMENT SYSTEM INCLUDING RADIO ANIMAL TAG AND ADDITIONAL TRANCEIVER(S)," filed on Jan. 21, 2008; U.S. patent application Ser. No. 11/282,295, titled "RADIO FREQUENCY ANIMAL TRACKING SYSTEM," filed Nov. 17, 2005; U.S. patent application Ser. No. 11/592,724, titled "FLEXIBLE ANIMAL TAG, PRINTING SYSTEM, AND METHODS," filed Nov. 2, 2006; and U.S. patent application Ser. No. 11/981,030, titled "POWER MANAGEMENT IN RADIO FREQUENCY DEVICES," filed Oct. 31, 2007, which are each hereby incorporated by reference in their entirety.

Materials

Various materials can be used during the manufacture of an electronic tag. Some example materials are as follows.

Thermoactive materials include thermoplastic, a resin and adhesive polymer, or the like. "Thermoplastic" typically refers to a plastic that can once hardened be melted and reset. As used herein, the phrase "resin and adhesive polymer" refers to more reactive or more highly polar polymers than thermoplastic materials.

Examples of thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like), polystyrenes (e.g., polystyrene homopolymers, polystyrene copolymers, polystyrene terpolymers, and styrene acrylonitrile (SAN) polymers), polysulfone, halogenated polymers (e.g., polyvinyl chloride, polyvinylidene chloride, polycarbonate, or the like, copolymers and mixtures of these materials, and the like. Examples of vinyl polymers include those produced by homopolymerization, copolymerization, terpolymerization, and like methods. Examples of homopolymers include polyolefins such as polyethylene, polypropylene, poly-1-butene, etc., polyvinylchloride, polyacrylate, substituted polyacrylate, polymethacrylate, polymethylmethacrylate, copolymers and mixtures of these materials, and the like. Examples of copolymers of alpha-olefins include ethylene-propylene copolymers, ethylene-hexylene copolymers, ethylene-methacrylate copolymers, ethylene-methacrylate copolymers, copolymers and mixtures of these materials, and the like. Other examples of thermoplastics include polypropylene (PP), polyethylene (PE), and polyvinyl chloride (PVC), copolymers and mixtures of these materials, and the like. Yet other examples of thermoplastics include polyethylene, polypropylene, polyvinyl chloride (PVC), low density polyethylene (LDPE), copoly-ethylene-vinyl acetate, copolymers and mixtures of these materials, and the like. Thermoplastics are examples of materials that can be injection molded.

Examples of resin and adhesive polymer materials include resins such as condensation polymeric materials, vinyl polymeric materials, and alloys thereof. Exemplary resin and adhesive polymer materials include polyesters (e.g., polyethylene terephthalate, polybutylene terephthalate, and the like), methyl diisocyanate (urethane or MDI), organic isocyanide, aromatic isocyanide, phenolic polymers, urea based polymers, copolymers and mixtures of these materials, and the like. Other exemplary resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. Other exemplary resin and adhesive polymer materials include polyester, methyl diisocyanate (urethane or MDI), phenolic polymers, urea based polymers, and the like. Resins are sometimes used for injection molding.

Examples of thermoactive materials include polymers derived from renewable resources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e.

BIOMAX), and "aliphatic-aromatic" copolymers (i.e. ECOFLEX and EASTAR BIO), mixtures of these materials and the like.

The present invention may be better understood with reference to the following examples. These examples are intended to be representative of specific embodiments of the invention, and are not intended as limiting the scope of the invention.

EXAMPLES

Example 1

Insulating Cap Protects Electronics from Excessive Temperatures

Purpose:

The purpose of this experiment was to determine whether the use of an insulating cap would adequately protect heat-sensitive electronic components while injection molding over the insulating cap with hot plastic.

Procedure:

A partially assembled radio frequency identification (RFID) tag was used in this experiment. The electronic tag included a previously molded plastic body portion and electronics, but did yet include a cover. Electronics were supported by the body. The electronics included a radio transceiver, a power source (i.e. a battery), a circuit board, an antenna, and a data processing system. In addition, a temperature sensor was electrically coupled to the control system. Software operating on the r.TAG was modified to communicate with the temperature sensor. The temperature sensor was a five pin temperature sensor, part number LM71 manufactured by National Semiconductor having headquarters in Santa Clara, Calif. The r.TAG was active during the experiment and transmitted temperature data during the test. The temperature data was received by a radio frequency receiver external to the r.TAG and communicated to a computing system that recorded the data. An insulating cap was arranged over electronics, including the antenna, the electrical components, the battery, and the temperature sensor. The insulating cap was made of nylon and had a thickness of about 0.025 inches. The electronics were fully enclosed between the insulating cap and body 502.

Once in the position described above, the temperature meter was turned on, and initially showed a temperature of approximately 33° C. (90° F.). Injection molding was then performed to apply molten plastic over the insulated cap and to edges of the body. The molten plastic had a temperature in a range from about 220° C. to about 230° C. and was under high pressure. The temperature sensor transmitted radio frequency signals that identified the temperature in the interior space between the body and the insulating cap. The plastic was then allowed to cool.

Result:

The experiment showed that use of an insulating cap during injection molding with hot plastic will adequately protect heat-sensitive electronics from excessive heat.

Figure 7:
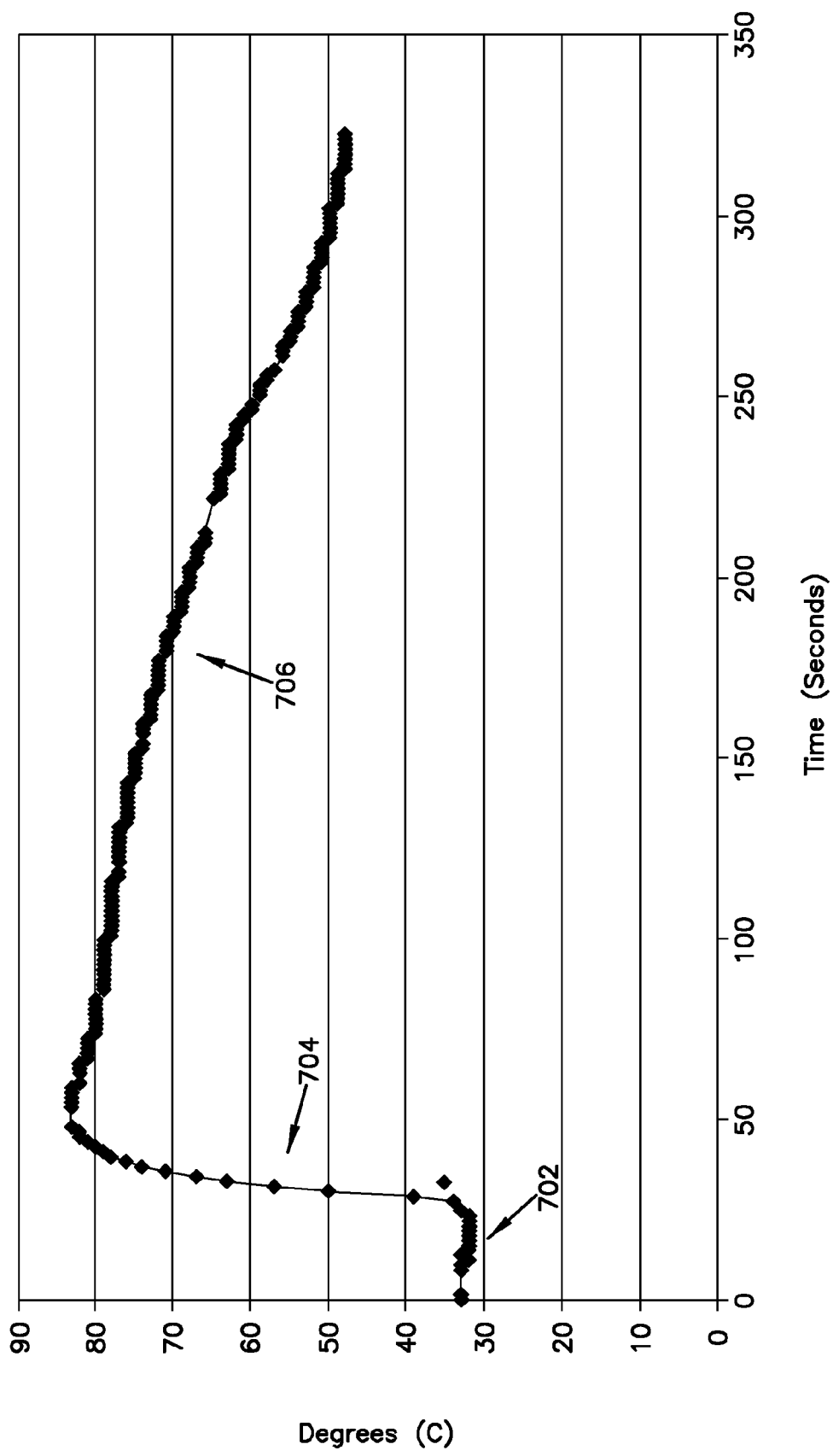
FIG. 7 is a temperature profile recorded during an experiment that shows that the insulating cap adequately protects electronics from heat when injection molding with hot plastic.

FIG. 7 is a graph illustrating the temperature profile recorded by the temperature sensor during the experiment described above. The temperature profile shows the temperature at various times. Temperatures are in ° C. and time is in seconds. The total time measured was about 325 seconds.

The temperature profile includes three primary segments, including first segment 702, second segment 704, and third segment 706. First segment 702 includes the time between about 0 seconds and about 25 seconds. Second segment 704 includes the time between about 25 seconds and about 50 seconds. Third segment 706 includes the time between about 50 seconds and about 325 seconds.

First segment 702 illustrates the starting temperature of the temperature sensor prior to the introduction of hot plastic. The temperature during first segment 702 was relatively steady at about 33° C.

Second segment 704 illustrates the temperature of the temperature sensor during injection molding of the molten plastic onto the insulating cap. The temperature of the molten plastic was between about 220° C. and about 230° C. The injection molding began after about 25 seconds, at which point the temperature is shown to have increased rapidly to a peak temperature of about 83° C.

Third segment 706 illustrates the temperature of the temperature sensor after introduction of the hot plastic. The temperature profile of third segment 706 is a relatively linear cooling from about 83° C. to about 48° C. at about 325 seconds.

The temperature profile shows that the insulating cap protected the electronics by limiting the maximum temperature at the electronics to about 83° F.

Another experiment was performed to verify that the electronics will fail if molten plastic is injection molded directly onto the electronics. The experimental setup was the same as described above, except that the insulating cap was not present and the temperature sensor was also not present. In this experiment, immediately upon introduction of the molten plastic onto the electronics, the tag stopped radio frequency communication, indicating that a failure had occurred. After the experiment, the plastic was cut away and many failures were identified. Therefore, this experiment showed that injection molding directly onto the electronics in the absence of the insulating cap will result in failure of the electronics.

Another experiment was also performed which included the insulating cap and temperature sensor, as described above. In this experiment, however, the insulating cap partially cracked upon introduction of the molten plastic. As a result, the temperature recorded by the temperature sensor immediately exceeded the maximum temperature of the temperature sensor (125° C.) and no data was initially available. Eventually the temperature cooled to below 125° C. at which point the temperature sensor began providing temperature data. The temperature data continued to be transmitted from 125° C. until the temperature reached room temperature. The fact that the radio communication with the temperature sensor continued showed that even upon a partial failure of the insulating cap, the insulating cap was still able to maintain the temperature of the interior space between the insulating cap and the body to a low enough temperature that the electronics did not fail. However, such excessive temperatures would have caused concern over the long term health of the battery seal.

Several hundred additional experiments have been performed in which a cover has been successfully injection molded using an insulating cap without harming the electronics. Therefore, it has been shown that the insulating cap will adequately protect the electronics from the high temperature of molten plastic during injection molding.

Conclusion

An insulating cap that prevents hot plastic from coming into direct contact with electronics will adequately protect heat-sensitive electronics from excessive heat while injection molding.

It should be noted that, as used in this specification and the appended claims, the singular forms "a," "an," and "the" include plural referents unless the content clearly dictates otherwise. Thus, for example, reference to a device containing "a circuit" includes a device having two or more circuits. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains.

The invention has been described with reference to various specific and preferred embodiments and techniques. However, it should be understood that many variations and modifications may be made while remaining within the spirit and scope of the invention.

What is claimed is:

1. An electronic tag comprising:
   an electronic device;
   a body adjacent the electronic device;
   a thermally insulating cap arranged to enclose the electronic device between the insulating cap and the body; and
   a cover on the insulating cap enclosing the insulating cap and the electronic device between the cover and the body, wherein the cover includes injection molded plastic.

2. The electronic system of claim 1, wherein the electronic device comprises an antenna.

3. The electronic system of claim 2, wherein the antenna comprises a coil of wire.

4. The electronic system of claim 1, wherein the electronic device comprises a radio frequency transmitter.

5. The electronic system of claim 1, wherein the electronic device comprises a radio frequency receiver.

6. The electronic system of claim 1, wherein the electronic device comprises a radio frequency transceiver.

7. The electronic system of claim 1, wherein the electronic device comprises a radio frequency identification circuit.

8. The electronic system of claim 1, wherein the electronic device comprises an integrated circuit.

9. The electronic system of claim 1, wherein the electronic device comprises an electromagnetic radiation communication device.

10. The electronic system of claim 1, wherein the electronic device comprises analog electronics.

11. The electronic system of claim 1, wherein the electronic device comprises digital electronics.

12. The electronic system of claim 1, wherein the electronic device is a battery.

13. The electronic system of claim 1, wherein the body supports the electronic device.

14. The electronic system of claim 1, wherein the electronic device is rigidly connected to the body.

15. The electronic system of claim 1, wherein the body includes a channel, and wherein the electronic device is in the channel.

16. The electronic system of claim 15, wherein the thermally insulating cap is inserted at least partially into the channel to enclose the electronic device between the thermally insulating cap and the channel.

17. The electronic system of claim 1, wherein the thermally insulating cap has a ring shape.

18. The electronic system of claim 17, wherein the thermally insulating cap has a channel formed in a side for receiving the electronic device.

19. The electronic system of claim 17, wherein the channel of the thermally insulating cap is sized to trap air adjacent to the electronic device when arranged to enclose the electronic device, wherein the air provides additional thermal insulation to the electronic device.

20. The electronic system of claim 1, wherein the thermally insulating cap is made of a high temperature resistant polymer.

21. The electronic system of claim 20, wherein the high temperature resistant polymer is acetal.

22. The electronic system of claim 1, further comprising a fastener for connecting the electronic system to another object.

23. The electronic system of claim 22, wherein the fastener is arranged to connect the electronic system to an animal.

24. The electronic system of claim 23, wherein the fastener comprises a pin and a grommet.

25. The electronic system of claim 23, wherein the fastener is arranged to puncture an ear of an animal and to connect the electronic system to the ear.

26. The electronic system of claim 22, wherein the fastener is a clip.

27. The electronic system of claim 22, wherein the fastener is adhesive.

28. The electronic system of claim 22, wherein the fastener is arranged to connect with a medical device.

29. The electronic system of claim 1, wherein the electronic device is configured to communicate with a theft deterrence system.

30. The electronic system of claim 1, wherein the electronic device is configured to communicate with a system for determining the location of the electronic system.

31. The electronic system of claim 1, wherein the electronic device is configured to communicate with a livestock monitoring system.

32. The electronic system of claim 31, wherein the electronic device provides information to the livestock monitoring system relating to food consumption of an animal by sending a signal to the livestock monitoring system when the animal is in close proximity to a food source.

33. A method of making an electronic tag, the method comprising:
   enclosing an electronic device between the body and an insulating cap; and
   injection molding a cover to enclose the electronic device and the insulating cap between the cover and the body portion, wherein the insulating cap insulates the electronic device from heat generated during injection molding.

34. The method of claim 33, wherein enclosing the electronic device further comprises trapping air between the body and the insulating cap.

35. The method of claim 33, the method further comprising fastening the electronic tag to an object.

36. The method of claim 35, the method further comprising fastening the electronic tag to an animal.

37. The method of claim 35, the method further comprising fastening the electronic tag to a medical device.

38. A method of making an electronic tag, the method comprising:
   enclosing an electronic device between the body and a cap; and injection molding a cover to enclose the electronic device and the cap between the cover and the body portion, wherein the cap protects the electronic device from pressure generated during injection molding.

39. An electronic tag for an animal comprising:
an electronic device;
a housing comprising:
  a body adjacent the electronic device;
  an insulating cap, wherein the electronic device is enclosed between the body and the insulating cap; and
  a cover on the insulating cap and connected to the body; and
a fastener arranged for engagement with the housing to attach the housing to the animal.

* * * * *